Jan. 24, 1956  C. HADDAD  2,732,108
NON-DRIP POURING CAP AND SPOUT
Filed Dec. 30, 1952
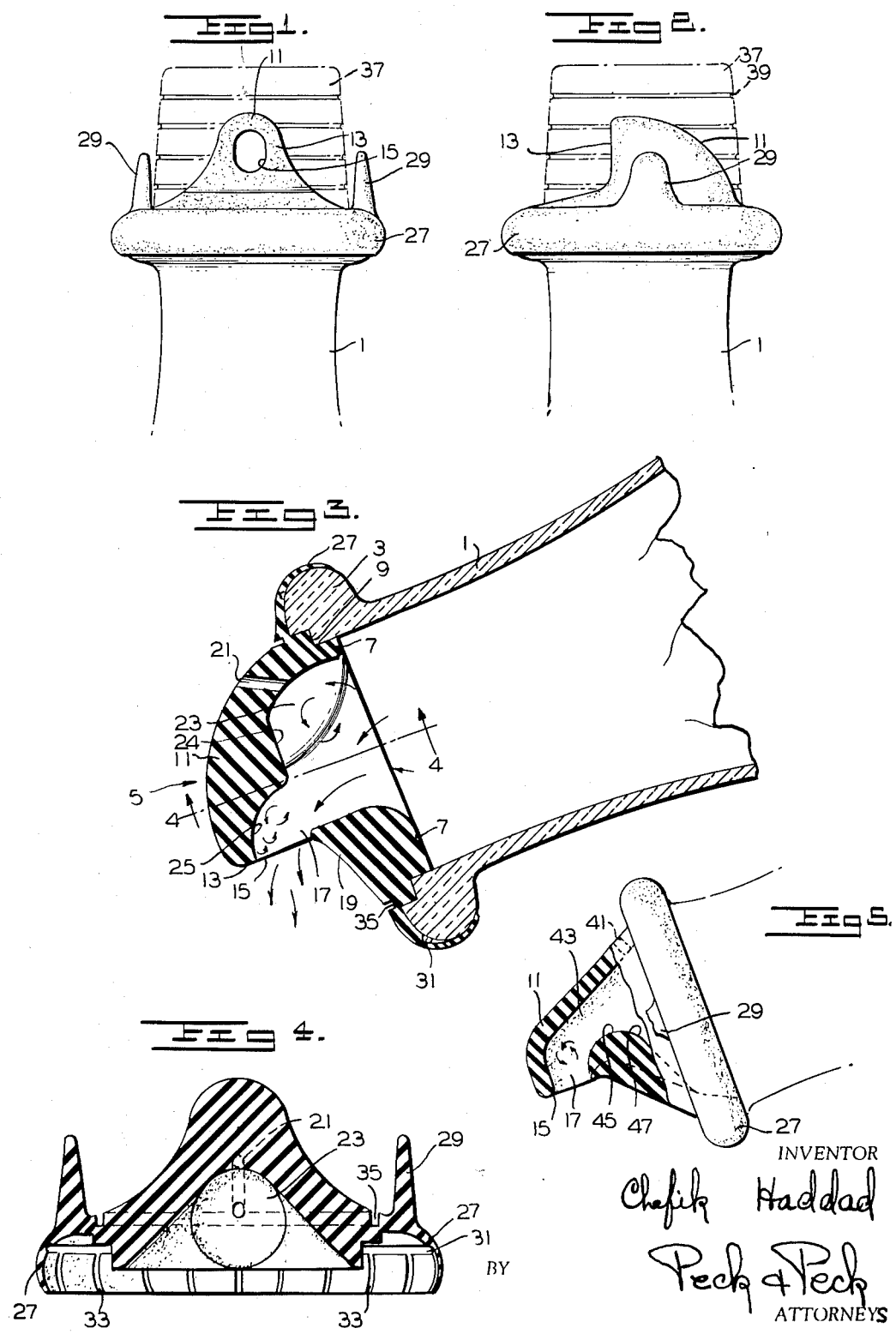
INVENTOR
Chafik Haddad
BY Peck & Peck
ATTORNEYS

United States Patent Office 2,732,108
Patented Jan. 24, 1956

2,732,108

NON-DRIP POURING CAP AND SPOUT

Chefik Haddad, Washington, D. C.

Application December 30, 1952, Serial No. 328,733

1 Claim. (Cl. 222—564)

This invention relates broadly to the art of dispensing liquids and in its more specific aspects it relates to a spout combined with a cap which prevents dripping following a dispensing or pouring operation and which when applied to a liquid container maintains the contents thereof free from contamination from exterior sources; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

As one example from among many of the use and adaptation of my invention I have selected its use on and with a portable liquid container which may be of the milk bottle type, and it is to be particularly understood that the invention may be used with many types of containers holding various types of liquids and it is also within my contemplation to incorporate certain unique features and characteristics of my invention in nozzles for liquid flow or dispensing lines wherein they will function to eliminate any dripping when feeding of the liquid to the nozzle is stopped.

Every user of cream or milk in the conventional glass cream or milk bottle has experienced the disagreeable and unsanitary dripping which occurs from the annular lip of the bottle after a part or even all of the fluid has been poured from the bottle. This dripping is particularly objectionable in milk and the like containers wherein it is usual to only pour a part of the contents from the container at a time and then stow the partly filled container in a refrigerator or other storage space. The drip after pouring spills on other foodstuffs in the refrigerator or on the shelves. Obviously this is unsanitary and requires constant cleaning of such storage spaces. This constant dripping also results in a sticky and dirty bottle for the drip flows down the body of the bottle where it must be picked up by the users thereof.

Many containers of the type of milk bottles have a disc closure cap which must be removed and replaced after every pouring. The cap, if it is not misplaced, becomes dirty from handling and fails to serve its prime function of keeping the contents of the container free from contamination. Such disc caps do not cover and keep the lip of the bottle clean which, of course, is an obvious unsanitary disadvantage.

I have overcome the objections and disadvantages of present day practices as outlined above, and many others, for I have evolved a cap and pouring spout for use with a large variety of liquid containers and for combination with dispensing nozzles, which completely eliminates liquid drip following a pouring or a dispensing operation. My cap and pouring spout not only acts to eliminate drip after pouring or dispensing, but it also functions to provide a removable closure for the container fully guarding against the contamination of the liquid therein, and it also has been designed for tight, leakproof clamping engagement on the mouth of a container or nozzle while being removable from and attached thereto with facility.

This invention is especially adapted for operative application to the mouth of a container after the original closure member has been removed, and in use it is kept thereon until the contents of the container have been removed. The contents may be poured through my cap and spout any number of times with no dripping and without loosening of the cap, and it is to be understood that my cap and spout has been designed with lasting qualities so that it may be used many times.

I have discovered that dripping may be eliminated by providing structure and configuration within the cap body and within the spout which produces turbulence within the body of liquid flowing through the cap and spout during a pouring operation. Such turbulence induces a motion in the liquid which tends toward a spiralling, whirling or eddy condition of the flowing liquid which appears to involve vortical tendencies. When my combination cap and spout is in operative position on the mouth of a portable liquid container, the container is tilted to pour the liquid through the cap and spout and from the container and to stop the pouring operation the container is moved back to upright or vertical position. During the pouring operation turbulence in the flowing liquid through the cap and spout is generated and upon returning the container to upright or normal position the liquid in the cap and spout flows back into the container. However, at the moment the pouring operation is stopped the liquid in the cap and spout is still in a turbulent condition and this turbulent action results in the liquid at or adjacent to the lip of the spout being returned back into the cap and into the container so that no liquid is left at the lip or mouth of the spout to drip therefrom.

The successful results which I have obtained are made even more satisfactory and effective in producing the non-drip characteristics of my cap and spout due to the formation and positioning of the mouth of the spout relative to the various configurations and structures of the device and to the paths of flow of the liquid being poured.

I have found that the desired turbulence in the flowing liquid may be generated by different means within the cap and spout and I have illustrated two forms or structures in the drawings whereby this turbulence may be generated.

I preferably form my cap and spout of a material such as rubber which has sufficient strength to function as desired, but a large number of different materials may be used in the fabrication of the cap and spout.

The cap proper is formed with means for clamping on the lip of a container, nozzle or the like and I have formed this means with novel structure insuring a firm grip on the lip of the container or the nozzle. I also have provided structure which is operable to distort or expand the clamping means to thereby facilitate the application of my device to a container or the like and its removal therefrom.

A further feature and characteristic of my invention resides in the provision of a cover for my entire assembly which is removable and may be used as a cup for pouring the liquid into from the container, and for measuring.

In accomplishing my purposes I have devised a successful cap and pouring spout which has no working parts to get out of order and may be used for long periods of time. The cap and pouring spout has been designed for easy cleaning and all areas thereof are accessible for this purpose.

The cap and pouring spout of my invention may be economically manufactured and sold and is of sturdy construction and may be removed from and attached to a large number of containers without substantial deterioration.

With the foregoing general objects, features and results in view, as well as certain others which will be apparent from the following explanation, the invention consists in certain novel features in design, construction, mounting and combination of elements, as will be more fully and particularly referred to and specified hereinafter.

Fig. 1 is a view in front elevation of my cap and pouring spout in operative position on a liquid container, parts of the container being broken away.

Fig. 2 is a view in side elevation similar in all other respects to Fig. 1.

Fig. 3 is a view in section of my cap and pouring spout in operative position on a liquid container in tilted pouring position, parts of the container being broken away.

Fig. 4 is a view taken on line 4—4 of Fig. 3.

Fig. 5 is a view partly in section of a modified form of cap.

Referring to the accompanying drawings wherein I have illustrated one example of an adaptation of my invention for dispensing a liquid, I have used the numeral 1 to designate a liquid container having the conventional annular lip 3 surrounding the mouth thereof. The liquid container 1 of the present example is portable, at least in so far as it is titable for pouring the liquid therefrom as illustrated in Fig. 3 of the drawings.

I have used the numeral 5 to designate in its entirety the combination cap and spout which may be formed of any suitable material such as rubber which has the necessary flexibility combined with a degree of rigidity to function as desired. The combination cap and spout of this invention includes a depending annular flange 7 shaped and of a size to snugly fit within the interior of the container to which the cap and spout is applied as clearly illustrated in Fig. 3 of the drawings. The body portion of the cap is of larger diameter than the flange and rises upwardly therefrom forming a shoulder 9 which seats on the conventional rim of the mouth of the container. The cap and spout is provided with a top or dome-like structure 11 which rises upwardly from a portion of the periphery of the cap and is preferably of reduced width relative to the diameter of the cap and the front of the top is formed with a vertical wall 13 having an opening 15 therein which is in communication with a liquid flow duct or spout 17 which is open to the interior of the cap for flow of liquid from the container into the cap through spout 17 for discharge through opening or mouth 15 of the spout. The front vertical wall of the top in which the mouth of the spout is provided is substantially parallel to the axis of the container or perpendicular to the plane of the mouth of the container. Consideration of the drawings discloses that the spout is substantially floorless for that portion 19 of the cap extending between the mouth 15 and the periphery of the cap is substantially radially removed outwardly from the plane of the mouth.

I provide a vent duct 21 extending through the top of the cap for venting the container as the liquid is poured therefore. In the interior surface of the top 11 of the cap is formed a recess or cavity 23 which is preferably positioned somewhat rearward relative to the spout. This cavity may be of generally circular configuration and I preferably though not necessarily provide a relatively plane surface 24 between the entrance to the spout and the cavity. I shall term this cavity the primary turbulence inducer and its function in a pouring operation will be explained hereinafter. The roof or top surface of spout 17 is of upwardly curved formation as at 25 to provide a secondary turbulence inducer adjacent to the mouth 15 of the spout.

A clamping skirt 27 extends from the cap and this skirt is of curved formation to fit and clamp about the lip 3 of the container to which the cap is removably fixed. I provide a pair of operating members which extend upwardly from the clamping skirt in diametrically opposed positions, the operating members being provided on the cap at opposite sides of the top 11. In operation to either apply or remove the combination cap and spout from a container the members 29 are pressed inwardly or toward each other to thereby expand or distort the clamping skirt so that it may more readily be slipped on or off the lip of the container.

In Fig. 4 of the drawings I have illustrated unique means on the clamping skirt by which the skirt is securely clamped and sealed to the lip of the container. On the interior face of the skirt a horizontal groove 31 is formed and a plurality of spaced grooves 33 extend from the groove 31 to the bottom edge of the skirt. Thus when the skirt is distorted by the application of pressure to operating members 29 and the skirt is applied to the container lip suction thereon will be created by these grooves and the skirt will be sealed to the container lip.

An annular groove 35 is molded or otherwise formed in the cap adjacent the periphery thereof which is adapted to receive therein the edge of a cup 37 which is placed over the cap and spout in inverted position and is seated in the groove. With the cup in this position it will be recognized that the entire cap and spout combination is covered and protected from contamination by dirt and dust. The cup may be graduated as at 39 for use as a measuring vessel.

When the cap and spout is operatively mounted on a liquid container and it is desired to pour all or a part of the contents therefrom, the cup 37 is removed from its seated position in groove 35 and the container 1 is tilted so that liquid will flow from mouth 15 of the spout. When the desired amount has been poured from the container, it is returned to normal upright position. When the liquid is being poured from the container, some of it flows into the primary turbulence inducing dome-like cavity 23 and a turbulence or whirling action is induced in the liquid as generally shown by the arrows in Fig. 3 of the drawings. The secondary turbulence inducing formation 25 in the spout 17 generates a further turbulent field in the liquid and as the pouring continues these turbulent areas are maintained. When the bottle is returned to normal upright position, the major part of the liquid will return by gravity to the container and any liquid which would otherwise be at dripping position at the mouth of the spout, will be drawn back out of dripping position because of the turbulent fields of the liquid, it being understood that such liquid will be drawn back before the turbulence ceases at cessation of the pouring operation. The tests I have made indicate that the primary and secondary turbulence inducers co-act to produce the no-drip characteristics of my device.

In Fig. 5 of the drawings I have illustrated a modified form of my invention and I have used the same reference numerals as those used in Figs. 1 through 4 for designating similar parts. The cap and spout combination of Fig. 5 includes the clamping skirt 27 which extends from the body of the cap as in the hereinbefore described form of the invention. The cap body is provided with an enlarged inlet 41 for flow of the liquid from the container into the cap. The spout 17 is in communication with the inlet 41 and provides a constricted passage 43 therein for flow of liquid to the mouth 15. In order to provide the constricted liquid flow passage 43 I form a rounded projection 45 which extends into the liquid flow passage. This projection is upwardly and inwardly curved as at 47 and functions to create a turbulence in the liquid flowing through the passage as indicated in a general way by the arrows. This turbulence results in a spiraling, whirling or eddy condition in the flowing liquid being poured from the container and draws the liquid back into the container from, at, or adjacent to the mouth 15 of the spout so that there will be no dripping from the spout when the pouring operation is stopped. The action of the liquid in preventing dripping in this form of my invention is broadly similar to that described in connection with the preferred form of my invention.

Tests have demonstrated that the caps and spouts illustrated and described do eliminate the usual external drippings which occur in container caps now known and in use, and such non-drip characteristics are attributable to the construction described which produce liquid turbulence and to the particular construction and configuration of the spout.

I claim:

A cap and spout for removable attachment to a liquid container adapted to be tilted during the operation of pouring liquid therefrom, said cap and spout having communicating liquid flow passages therethrough and the spout having a liquid outlet which is at substantially right angles to the plane of the level of the liquid in the container when the container is in normal upright non-pouring position, and said cap being formed with a cavity in the upper wall of the liquid flow passage, the cavity having a contour substantially coincident with a hemispherical surface and adapted to receive liquid as it flows from the container to create a rotary action in the liquid, and means in the spout for creating a rotary action in the liquid flowing therethrough, the rotary action of the liquid in the cap and spout being such that it will draw back into the cap and spout the liquid adjacent the outlet of the spout when the container is returned to normal upright position following a pouring operation to thereby eliminate external dripping from the spout.

References Cited in the file of this patent

UNITED STATES PATENTS

| | | |
|---|---|---|
| 869,246 | Jones | Oct. 29, 1907 |
| 1,282,103 | Moffat | Oct. 22, 1918 |
| 1,304,800 | Nowack | May 27, 1919 |
| 1,654,389 | Straub | Dec. 27, 1927 |
| 2,099,292 | Brown | Nov. 16, 1937 |
| 2,612,293 | Michel | Sept. 30, 1952 |